(12) United States Patent
Babarskas et al.

(10) Patent No.: US 9,621,224 B2
(45) Date of Patent: Apr. 11, 2017

(54) PORTABLE AUDIO NETWORKING SYSTEM

(71) Applicant: Shure Acquisition Holdings, Inc., Niles, IL (US)

(72) Inventors: Christopher Babarskas, Jasper, IN (US); Ryan Jerold Perkofski, Lake Bluff, IL (US); David Cerra, Skokie, IL (US); William J. Oakley, Skokie, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 845 days.

(21) Appl. No.: 13/875,688

(22) Filed: May 2, 2013

(65) Prior Publication Data

US 2014/0269951 A1 Sep. 18, 2014

Related U.S. Application Data

(60) Provisional application No. 61/800,472, filed on Mar. 15, 2013.

(51) Int. Cl.
*G06F 17/00* (2006.01)
*H04B 3/54* (2006.01)
(Continued)

(52) U.S. Cl.
CPC ............... *H04B 3/542* (2013.01); *H04R 3/00* (2013.01); *H04R 5/04* (2013.01); *H04R 27/00* (2013.01); *H04R 29/004* (2013.01)

(58) Field of Classification Search
CPC .......... H04B 3/542; H04R 3/00; H04R 27/00; H04R 29/004; H04R 5/04
See application file for complete search history.

(56) References Cited

U.S. PATENT DOCUMENTS 7,292,876 B2 * 11/2007 Bosch ................. G06F 13/4291
455/550.1
2002/0061012 A1 * 5/2002 Thi ......................... H04B 3/23
370/352

(Continued)

FOREIGN PATENT DOCUMENTS

| EP | 1517464 A2 | 3/2005 |
| EP | 2442587 A1 | 4/2012 |
| WO | 2010/120855 A1 | 10/2010 |

OTHER PUBLICATIONS

Willett, J., "Digital Microphones—what's it all about?" 130th Convention of the AES, May 13, 2011, XP055120976, Retrieved from the Internet: URL:http://www.aes.org/tmpfiles/elib/20140602/15833.pdf [retrieved on Jun. 2, 2014].

(Continued)

*Primary Examiner* — Simon Sing
*Assistant Examiner* — Eugene Zhao
(74) *Attorney, Agent, or Firm* — William J. Lenz, Esq.; Neal, Gerber & Eisenberg LLP

(57) ABSTRACT

A portable audio networking system is provided that includes master devices and slave devices in communication over cables adapted to simultaneously transport a digital audio signal, DC power, and a data signal. Master devices are configured to receive a digital audio signal, distribute power, and transceive a data signal, and slave devices are configured to transmit the digital audio signal to master devices, receive the power from master devices, and transceive the data signal with master devices. Slave devices can include wireless audio receivers that receive an RF signal containing an audio signal from wireless audio transmitters. Master devices can include gateway interconnection devices that act as hubs and routers for the system. The reduction in the number of cables compared to traditional systems results (Continued)

in less weight for crew members to carry and easier setup of the system. Remote control of wireless audio transmitters is also enabled.

9 Claims, 5 Drawing Sheets

(51) Int. Cl.
  *H04R 3/00* (2006.01)
  *H04R 5/04* (2006.01)
  *H04R 27/00* (2006.01)
  *H04R 29/00* (2006.01)

(56) References Cited

U.S. PATENT DOCUMENTS

| | | | |
|---|---|---|---|
| 2002/0151302 A1* | 10/2002 | Schmidt | H04Q 3/0075 455/426.1 |
| 2004/0116151 A1* | 6/2004 | Bosch | G06F 13/4291 455/550.1 |
| 2010/0148940 A1* | 6/2010 | Gelvin | H04L 67/12 340/286.02 |
| 2010/0290638 A1* | 11/2010 | Heineman | H04H 60/04 381/77 |

OTHER PUBLICATIONS

International Search Report and Written Opinion from PCT Published Application No. WO 2014/150018, dated Sep. 23, 2014, 18 pages.

* cited by examiner

| RJ45 Pin # | Wire Color | Signal | Power Pass-Thru |
|---|---|---|---|
| 1 | White/Green | Data+ | Power+ (unregulated DC) |
| 2 | Green | Data- | Power+ (unregulated DC) |
| 3 | White/Orange | Audio+ | Power- (system ground) |
| 4 | Blue | Available for Future Expansion | Available for Future Expansion |
| 5 | White/Blue | Available for Future Expansion | Available for Future Expansion |
| 6 | Orange | Audio- | Power- (system ground) |
| 7 | White/Brown | Available for Future Expansion | Available for Future Expansion |
| 8 | Brown | Available for Future Expansion | Available for Future Expansion |

FIG. 5

PORTABLE AUDIO NETWORKING SYSTEM

CROSS-REFERENCE TO RELATED APPLICATION

This application claims the benefit of U.S. Provisional Patent Application No. 61/800,472, filed on Mar. 15, 2013, the contents of which are fully incorporated herein by reference.

TECHNICAL FIELD

This application generally relates to a portable audio networking system. In particular, this application relates to networking of portable audio devices using cables adapted to simultaneously transport a digital audio signal, power, and a data signal.

BACKGROUND

Audio production can involve the use of many components, including microphones, wireless audio transmitters, wireless audio receivers, recorders, and/or mixers for capturing and recording the sound of productions, such as television programs, newscasts, movies, live events, and other types of productions. The microphones typically capture the sound of the production, which is wirelessly transmitted from the microphones and/or the wireless audio transmitters to the wireless audio receivers. The wireless audio receivers can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

The crew member typically carries a bag that contains the wireless audio receivers, recorder, mixer, and a battery to power these components. It is not uncommon to have multiple wireless audio receivers that correspond to each microphone and/or wireless audio transmitter that is capturing the sound of a production. Each wireless audio receiver typically has a cable to transmit an audio signal to the recorder, and another cable to receive power from the battery. There are also cables from the battery to power the recorder and mixer. Because of the large number of cables, it can be time consuming to setup and connect the components, the possibility of problems is increased (e.g., due to faulty cables, loose connections, cable failures, etc.), and the weight of the bag can be uncomfortably heavy for the crew member. Furthermore, the crew member generally cannot remotely control the wireless audio transmitters once they have been deployed.

Accordingly, there is an opportunity for a system that addresses these concerns. More particularly, there is an opportunity for a portable audio networking system that uses cables adapted to simultaneously transport a digital audio signal, power, and a data signal between the components of the system.

SUMMARY

The invention is intended to solve the above-noted problems by providing portable audio networking systems that are designed to, among other things: (1) utilize cables that simultaneously transport a digital audio signal, power signal, and a bi-directional data signal between a master device, such as a gateway interconnection device, and a slave device, such as a wireless audio receiver; (2) distribute power from a power source through the master device to the slave device; (3) receive digital audio signals at the master device from the slave device; (4) transceive data signals between the master device and the slave device; (5) generate a combined digital audio signal at a gateway interconnection device for recording and mixing purposes; and (6) provide remote monitoring and control over the wireless audio receivers and wireless audio transmitters.

In an embodiment, a portable audio networking system may include a master device and a slave device. The master device may be configured to receive a digital audio signal, receive DC power from a power source, provide the DC power, and transceive a data signal. The slave device may be in communication with the master device and be configured to transmit the digital audio signal to the master device, receive the DC power from the master device, and transceive the data signal with the master device. The master device and the slave device may be in communication over a cable adapted to simultaneously transport the digital audio signal, the DC power, and the data signal.

In another embodiment, a portable audio networking system may include a gateway interconnection device and a wireless audio receiver. The gateway interconnection device may be configured to receive a digital audio signal, receive DC power from a power source, provide the DC power, and transceive a data signal. The wireless audio receiver may be in communication with the gateway interconnection device and be configured to transmit the digital audio signal to the gateway interconnection device, receive the DC power from the gateway interconnection device, and transceive the data signal with the gateway interconnection device. The gateway interconnection device and the wireless audio receiver may be in communication over a Category 5 twisted-pair cable adapted to simultaneously transport the digital audio signal, the DC power, and the data signal.

In a further embodiment, a portable audio networking system may include a wireless access point and a wireless audio receiver. The wireless access point may be configured to receive DC power from a power source, provide the DC power, and transceive a data signal, and be further configured to wirelessly communicate with one or more of a wireless audio transmitter or an electronic control device, and enable control of a functionality of the wireless audio transmitter and/or other network elements, such as the wireless audio receiver. The wireless audio receiver may be in communication with the wireless access point and be configured to receive the DC power from the wireless access point and transceive the data signal with the wireless access point. The wireless access point and the wireless audio receiver may be in communication over a Category 5 twisted-pair cable adapted to simultaneously transport the DC power and the data signal.

In another embodiment, a portable audio networking system may include a wireless access point, a video camera including a power source, a wireless audio receiver, and an infrared adapter. The wireless access point may be configured to receive a DC power from a power source, provide the DC power, and transceive a data signal, and be further configured to wirelessly communicate with one or more of a wireless audio transmitter or an electronic control device, and enable control of a functionality of the wireless audio transmitter. The wireless audio receiver may include a first infrared transceiver and be configured to wirelessly receive a radio frequency (RF) signal containing an audio signal from a wireless audio transmitter, and generate a digital audio signal based on the audio signal. The RF signal may include one or more of an analog modulated signal or a digital modulated signal. The infrared adapter may include a second infrared transceiver and be configured to receive the DC power from the wireless access point and transceive the data signal with the wireless access point. The first infrared transceiver of the wireless audio receiver and the second infrared transceiver of the infrared adapter may transceive the data signal over an infrared (IR) signal. The wireless access point and the infrared adapter may be in communication over a Category 5 twisted-pair cable adapted to simultaneously transport the digital audio signal, the DC power, and the data signal.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIG. 5 is an exemplary pinout of a cable adapted to simultaneously transport a digital audio signal, DC power, and a bi-directional data signal.

DETAILED DESCRIPTION

Figure 1:
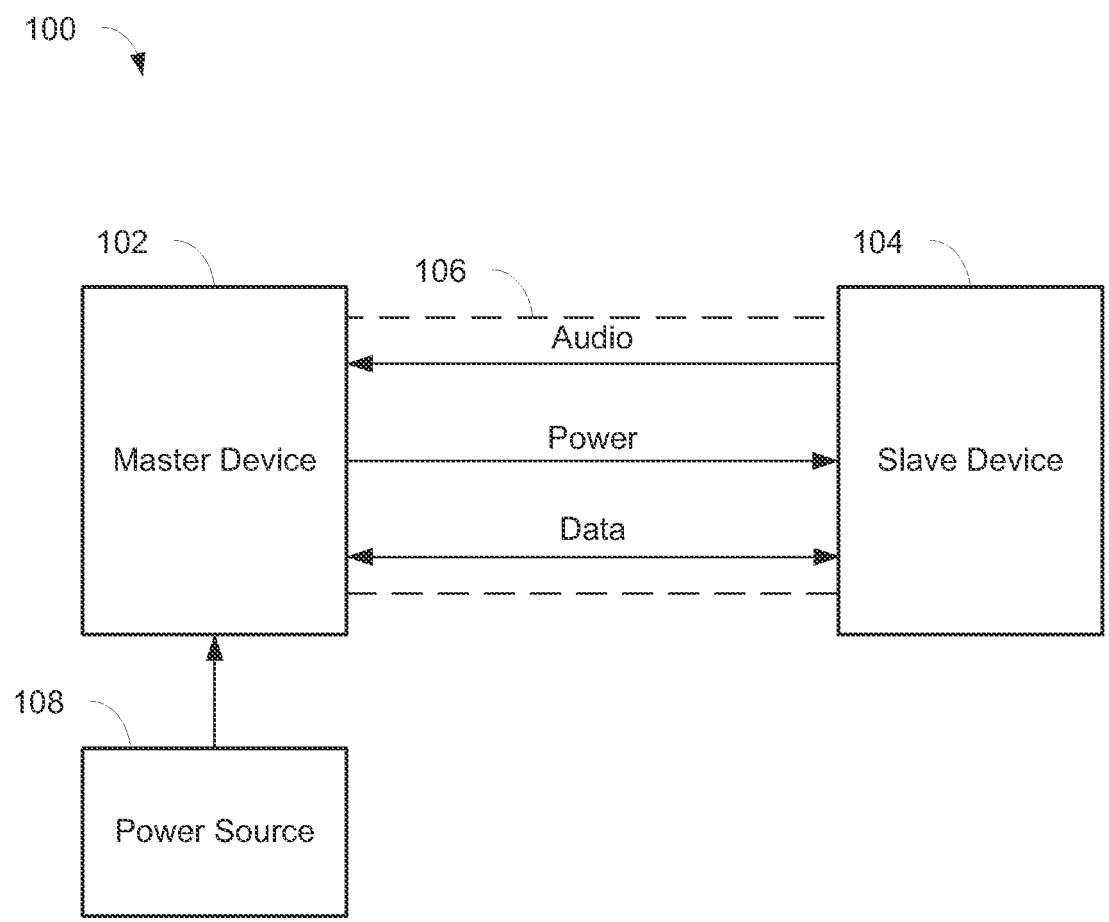
FIG. 1 is a block diagram of a portable audio networking system including a master device and a slave device, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates a block diagram of a portable audio networking system 100 for the networking of audio components and distribution of audio, data, and power. The system 100 may include a master device 102, a slave device 104, a cable 106 for connecting the master device 102 and the slave device 104, and a power source 108. On the cable 106, the master device 102 may distribute power from the power source 108 to the slave device 104 and/or accept an audio signal from the slave device 104. Examples of a master device 102 include a gateway interconnection device or a wireless access point, as described further below. The slave device 104 may receive power from the master device 102 and/or transmit an audio signal on the cable 106. An example of a slave device 104 includes a wireless audio receiver, an audio recorder/mixer, or a wireless access point, as described further below. For example, the audio recorder/mixer and/or wireless access point may be considered a slave device in a system that includes a gateway connection device that is always considered a master device. In this way, systems have a hierarchy that clearly denotes which components are maintaining control. Data may also be communicated between the master device 102 and the slave device 104 on the cable 106. The power source 108 may include a lithium-ion battery or DC power supply, for example, and/or other power sources.

The cable 106 may simultaneously transport an audio signal, a power signal, and a bi-directional data signal. In the system 100 shown in FIG. 1, the audio signal is transmitted from the slave device 104 to the master device 102 over the cable 106, the power signal is transmitted from the master device 102 to the slave device 104 over the cable 106, and the data signal is transceived between the master device 102 and the slave device 104 over the cable 106. The cable 106 may be a Category 5 unshielded twisted-pair cable that includes RJ45 connectors for connecting the cable 106 to RJ45 ports on the master device 102 and the slave device 104. The maximum length of the cable 106 may be 100 m, but may be other lengths. The cable 106 may include a total of eight wires with four twisted pairs. In one embodiment, the cable 106 may include two differential twisted pairs for transporting the audio signal, the power signal, and the data signal. An exemplary pinout for the cable 106 is shown in FIG. 5. In particular, a first differential pair, e.g., pins 3 and 6, may transport the audio signal and the ground of the power signal. A second differential pair, e.g., pins 1 and 2, may transport the data signal and the positive voltage of the power signal. While these particular wires and pins of the cable 106 are described, other wires and pins of the cable 106 may be utilized to simultaneously transport an audio signal, a power signal, and a data signal. Furthermore, additional audio signals, data signals, and/or power signals may be transported on the other pins and/or differential twisted pairs of the cable 106. Pins of the cable 106 that are not currently used may be available for future expansion.

The audio signal transported on the cable 106 may be a digital audio signal that conforms to the Audio Engineering Society AES3 standard. The AES3 standard defines a self-clocking interface that can handle up to 96 kHz, 24-bit stereo audio. In some embodiments, the digital audio signal transported on the cable 106 may be 48 kHz, 24-bit stereo audio. In other embodiments, the digital audio signal may have a different sampling rate, may be encoded with a different number of bits, and/or may have mono audio. Other appropriate standards may also be utilized for the audio signal.

The audio signal may be transported on a first differential pair, e.g., pins 3 and 6, of the cable 106.

The data signal transported on the cable 106 may be conform to the EIA-485 standard, also known as RS-485. The EIA-485 standard defines a serial data communication interface that supports multiple drivers on the same bus to allow for bi-directional communication. In some embodiments, the data signal transported on the cable 106 has a data rate of 250 kbps, and the receivers included in the components may be true fail-safe receivers that prevent undetermined states when the bus is idle at 0 V, during a short circuit condition, or during an open circuit condition. In other embodiments, the data rate may be higher or lower and/or other types of receivers may be utilized in the components. The cable 106 is intended to directly connect two components, e.g., a master device 102 and a slave device 104. Other appropriate standards, e.g., EIA-232, EIA-422, etc., may be utilized for the data signal. The data signal may be transported on a second differential pair, e.g., pins 1 and 2, of the cable 106.

The information contained in the data signal may include commands, statuses, and/or other information sent and received from the components of the system 100 for monitoring and control purposes, for example. The serial data communication may conform to the ANSI E1.17 2006 Architecture for Control Networks (ACN) standard that is maintained by the American National Standards Institute (ANSI). The ACN standard defines protocols for controlling and managing various devices, such as the components of the system 100. The protocols include the Session Data Transport Protocol (SDT), the Device Management Protocol (DMP), and the Device Description Language (DDL), among other protocols.

The functions of the master device 102 and/or the slave device 104 can be represented as variables. Examples of such variables may include RF Channel (e.g., the setting denoting the RF frequency for communication between a wireless audio receiver and a wireless audio transmitter), Audio Gain, Audio Level Monitoring, Mute, or Audio Configuration. A device can be monitored by retrieving the values of its variables, and a device can be controlled by setting the values of its variables. For example, using DMP, a device can send a "get" command to retrieve a value of a variable from another device and/or send a "set" command to set a value of a variable on another device. The DMP also provides an addressing scheme for the variables of a device. In some embodiments, the SDT and DDL may be implemented in the system 100 when directly connecting more than two devices and/or for compatibility with other networks that utilize the ACN standard.

The power signal may be DC power and be transported over the cable 106 based on aspects of the Power over Ethernet (PoE) standard. The PoE standard enables the passing of electrical power along with data on cables suitable for Ethernet networking, such as a Category 5 cable. In one embodiment, as defined by the PoE standard, the power signal may be transported on the Mode A differential twisted pairs (e.g., pins 1 and 2, and pins 3 and 6), and in another embodiment, the power signal may be transported on the Mode B differential twisted pairs (e.g., pins 4 and 5, and pins 7 and 8). In some embodiments, the unregulated voltage from the power source 108 may be provided as the power signal on the cable 106 to account for minimal power dissipation and conversion losses. As such, the slave device 104 may be powered directly from the power source 108 over the cable 106, while the master device 102 monitors and maintains this DC connection for fault protection. The power source 108 may also provide electrical power to the master device 102.

The master device 102 may act as a piece of power sourcing equipment and the slave device 104 may act as a powered device. The slave device 104 may include a 25 kΩ resistor between the differential twisted pairs to indicate that a power signal may be provided to the slave device 104. The voltage on the cable may range from 7-18 V with a maximum current of 1 A, for example, but may be capable of other voltages and/or currents. Other appropriate standards may be utilized for the power signal. Each of the master device 102 and the slave device 104 may include transformers to isolate the digital audio signal and the data signal on the cable 106 so that the power signal may be transported on the cable 106 as a common-mode voltage.

Figure 2:
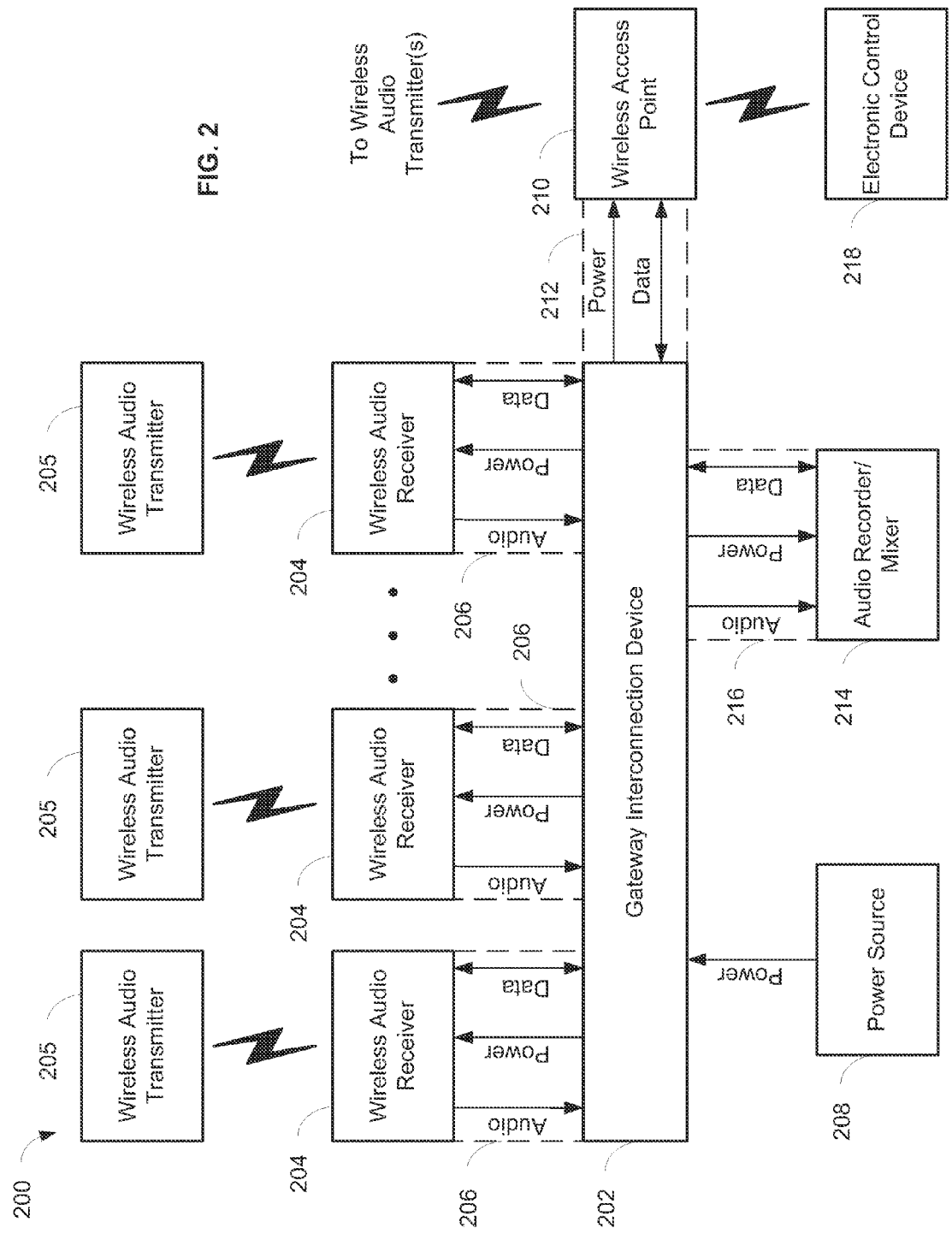
FIG. 2 is a block diagram of a portable audio networking system including a gateway interconnection device, in accordance with some embodiments.

FIG. 2 illustrates a block diagram of a portable audio networking system 200 for the networking of audio components and distribution of audio, data, and power. The system 200 may include a gateway interconnection device 202 that acts as a master device for physically interconnecting the components of the system 200 with cables that simultaneously transport audio signals, data signals, and/or power signals. The gateway interconnection device 202, acting as a master device, may distribute power from a power source 208 to slave devices (such as wireless audio receivers 204) and accept an audio signal from the slave devices via cables. Data may also be communicated between the gateway interconnection device 202 and slave devices. In the system 200, each of the cables 206, 212, and 216 may be a Category 5 unshielded twisted-pair cable that includes RJ45 connectors for connecting the cable to RJ45 ports on the components of the system 200, as described above.

In the system 200, each of the wireless audio receivers 204 may generate and transmit one or more digital audio signals to the gateway interconnection device 202 via a cable 206. In one embodiment, the digital audio signals transported on the cable 206 conform to the AES3 standard, as described above. The digital audio signals may be based on audio signals contained in one or more radio frequency (RF) signals received by a wireless audio receiver 204 from a wireless audio transmitter 205. In some embodiments, a single wireless audio receiver 204 can receive multiple audio signals on respective RF signals from multiple wireless audio transmitters 205. In this case, the wireless audio receiver 204 can generate and transmit multiple digital audio signals to the gateway interconnection device 202 based on the multiple audio signals. The multiple digital audio signals can be transmitted via a cable 206. The number of wireless audio receivers 204 in the system 200 may be reduced because each wireless audio receiver 204 can receive multiple RF signals from multiple wireless audio transmitters 205. Embodiments of a wireless audio receiver 204 are disclosed in a concurrently-filed commonly-assigned patent application, titled "Wireless Audio Receiver System and Method" Ser. No. 61/800364, which is hereby incorporated by reference in its entirety.

The wireless audio transmitter 205 may be a component that wirelessly transmits the RF signal containing the audio signal to the wireless audio receiver 204. The audio signal may be sound captured by a microphone from a production, for example. In some embodiments, the wireless audio transmitter 205 is an integrated handheld microphone and RF transmitter, such as an AXT200, ULXD2, or UR2 microphone available from Shure Inc. In other embodiments, a microphone is in wired communication with the wireless audio transmitter 205, such as an AXT100, ULXD1, or UR1 bodypack transmitter available from Shure Inc. The RF signal may be an analog modulated signal or a digital modulated signal. The wireless audio transmitter 205 and its corresponding wireless audio receiver 204 may be synchronized so that the same frequency is utilized for communications between the components. For example, a user may have synchronized the wireless audio transmitter 205 and its corresponding wireless audio receiver 204 by physically lining up each component's infrared synchronization port and pressing a sync button on the wireless audio receiver 204.

The gateway interconnection device 202 may generate a combined digital audio signal based on the digital audio signals received from the wireless audio receivers 204. The combined digital audio signal may be transmitted from the gateway interconnection device to an audio recorder/mixer 214 via a cable 216. The combined digital audio signal may conform to the Dante standard for transmitting audio over Ethernet, or may conform to another standard. The gateway interconnection device 202 and the audio recorder/mixer 214 may be connected by the cable 216 as an Ethernet connection. The gateway interconnection device 202 may consolidate and provide the digital audio signals from multiple wireless audio receivers 204 as the combined digital audio signal to the audio recorder/mixer 214. For example, the combined digital audio signal may include eight channels of audio that are comprised of two channels of audio received from each of four wireless audio receivers 204. The audio recorder/mixer 214 may be one or more components that records the audio signals onto a medium, such as flash memory, hard drives, solid state drives, tapes, optical media, etc.; and/or enables the mixing of the audio signals (e.g., combining, routing, changing, and/or otherwise manipulating the audio signals). In some embodiments, the audio recorder/mixer 214 can be a laptop computer, desktop computer, tablet computer, smartphone, or other electronic device for recording and/or mixing the audio signals. In some embodiments, an Ethernet compatible output of the gateway interconnection device 202 may be able to connect the system 200 to any conventional Ethernet-based network. In this way, the various components of the system 200 may be networked together, and the system 200 may also be networked with external entities and components that utilize Ethernet.

The gateway interconnection device 202 may provide electrical power from a power source 208 to the components of the system 200. The power source 208 may provide electrical power to the gateway interconnection device 202, which may distribute the electrical power to the wireless audio receivers 204, audio recorder/mixer 214, and/or wireless access point 210. In particular, the wireless audio receivers 204 may receive a power signal from the gateway interconnection device 202 via the cables 206, and the audio recorder/mixer 214 may receive a power signal from the gateway interconnection device 202 via the cable 216. A wireless access point 210 may also receive a power signal from the gateway interconnection device 202 via a cable 212. The gateway interconnection device 202 may also include a pass-through power interface to allow a component to receive a power signal through another type of cable. As described above, the power signal may be DC power and be transported over the cables 206, 212, and 216. In some embodiments, the gateway interconnection device 202 may monitor and validate whether the wireless audio receivers 204 are receiving power normally. If there is a fault in one of the wireless audio receivers 204, then the gateway interconnection device 202 can disable communications with the particular wireless audio receiver 204.

Data signals may be transmitted and received between the gateway interconnection device 202 and the components of the system 200. The information contained in the data signal may include commands, statuses, and/or other information sent and received from the components of the system 200 for monitoring and control purposes. Data signals may be routed to and from the gateway interconnection device 202, the wireless audio receivers 204, the wireless access point 210, and/or the audio recorder/mixer 214 on their respective cables 206, 212, and 216. The data signals may conform to the EIA-485 standard and the serial data communication contained in the data signal may conform to Architecture for Control Networks (ACN) standard, as described above. Examples of information contained in data signals may include, for example, an RF frequency change command (for changing the communications frequency between a wireless audio receiver and a wireless audio transmitter), audio gain status, audio configuration information, or audio level monitoring. In some embodiments, the gateway interconnection device 202 may also be in wired or wireless communication with other components and/or networks (not shown) to act as a bridge between the other components and/or networks and the system 200. For example, the gateway interconnection device 202 may be connected to another component and/or network over an Ethernet connection.

The wireless access point 210 may enable the monitoring and control of the wireless audio transmitters 205 from an electronic control device 218. The wireless access point 210 may communicate with the electronic control device 218 over a Wi-Fi IEEE 802.11 connection, and simultaneously communicate with the wireless audio transmitters 205 over a 2.4 GHz IEEE 802.15.4 connection (e.g., through a ZigBee-based protocol, such as ShowLink Remote Control, available from Shure Inc.). The gateway interconnection device 202 and the wireless access point 210 may be connected by the cable 212 as an Ethernet connection, in some embodiments. In one embodiment, the electronic control device 218, such as a smartphone, tablet computer, laptop computer, desktop computer, or the like, can be in communication with the wireless access point 210 and remotely monitor and control functions of the wireless audio transmitters 205. For example, the electronic control device 218 may be used to adjust the gain of the wireless audio transmitters 205, monitor audio levels and timecodes, and/or monitor and control the wireless aspects of the system 200, such as RF performance, statistics, etc. An application, such as Wireless Workbench available from Shure Inc., executing on the electronic control device 218 may enable such monitoring and control.

Any component of the system 200 may generally be able to exchange data with any other component of the system 200 for monitoring and/or control purposes. In some embodiments, the wireless access point 210 may enable the monitoring and control of the wireless audio transmitters 205 from the audio recorder/mixer 214 and/or from other components of the system 200. For example, a setting on a wireless audio transmitter 205, such as the gain or muting, may be adjusted by a user at the audio recorder/mixer 214. A data signal including an appropriate command may be sent from the audio recorder/mixer 214 through the gateway interconnection device 202 and the wireless access point 210 to the wireless audio transmitter 205. The wireless audio transmitter 205 can send a data signal back to the audio recorder/mixer 214 through the wireless access point 210 and the gateway interconnection device 202 to acknowledge execution of the command. As another example, if interference is detected on a frequency currently being utilized by a wireless audio receiver 204 and a wireless audio transmitter 205, the frequency can be changed to one with less interference. A data signal including an appropriate command may be sent to the wireless audio transmitter 205 through the gateway interconnection device 202 and the wireless access point 210 so that both the wireless audio receiver 204 and the wireless audio transmitter 205 are changed to a new frequency.

In other embodiments, components of the system 200, such as the wireless audio receiver 204, may be monitored and/or controlled from the audio recorder/mixer 214 and/or from other components, even if the wireless access point 210 is not present in the system 200. For example, data can be sent from the audio recorder/mixer 214 to the gateway interconnection device 202 via the cable 216, and then from the gateway interconnection device 202 to the wireless audio receiver 204 via the cable 206. Such data may include a command to adjust the gain of the wireless audio receiver 204, and/or a status of the audio levels of the wireless audio receiver 204, for example.

The system 200 shown in FIG. 2 can solve the cabling, weight, setup, and control problems in existing audio production configurations. A user, such as a crew member, may carry the gateway interconnection device 202, wireless audio receivers 204, cables 206, power source 208, wireless access point 210, cable 212, audio recorder/mixer 214, cable 216, and/or electronic control device 218 in a bag, for example. Because only one cable is needed to transport audio signals, data signals, and power between the gateway interconnection device 202 and each of the other components in the system 200, the number of cables utilized in the system 200 is significantly reduced compared to existing audio production configurations. Setup time is also reduced because there are fewer cables for the user to connect. Moreover, because the number of cables is reduced, the weight of the bag carried by the crew member is decreased. The Category 5 cables utilized in the system 200 are durable, lightweight, inexpensive, readily available, easily customized to desired lengths, and field serviceable. Monitoring and control of the components of the system 200, and remote control of the wireless audio transmitters 205 is enabled using the system 200. The system 200 is also scalable to network any number of components, dependent on the needs of the user.

Figure 3:
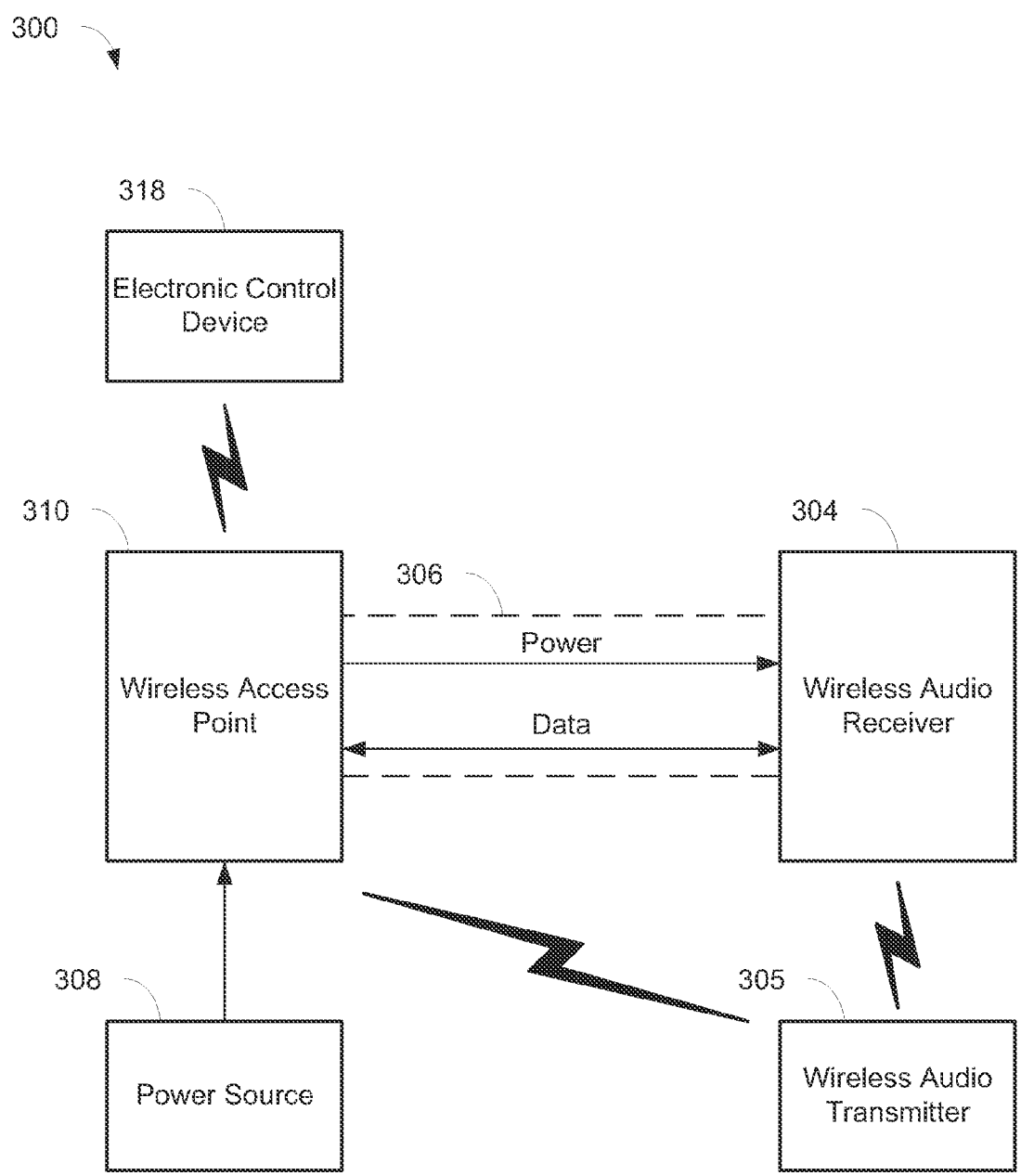
FIG. 3 is a block diagram of a portable audio networking system including a wireless access point and a wireless audio receiver, in accordance with some embodiments.
Figure 4:
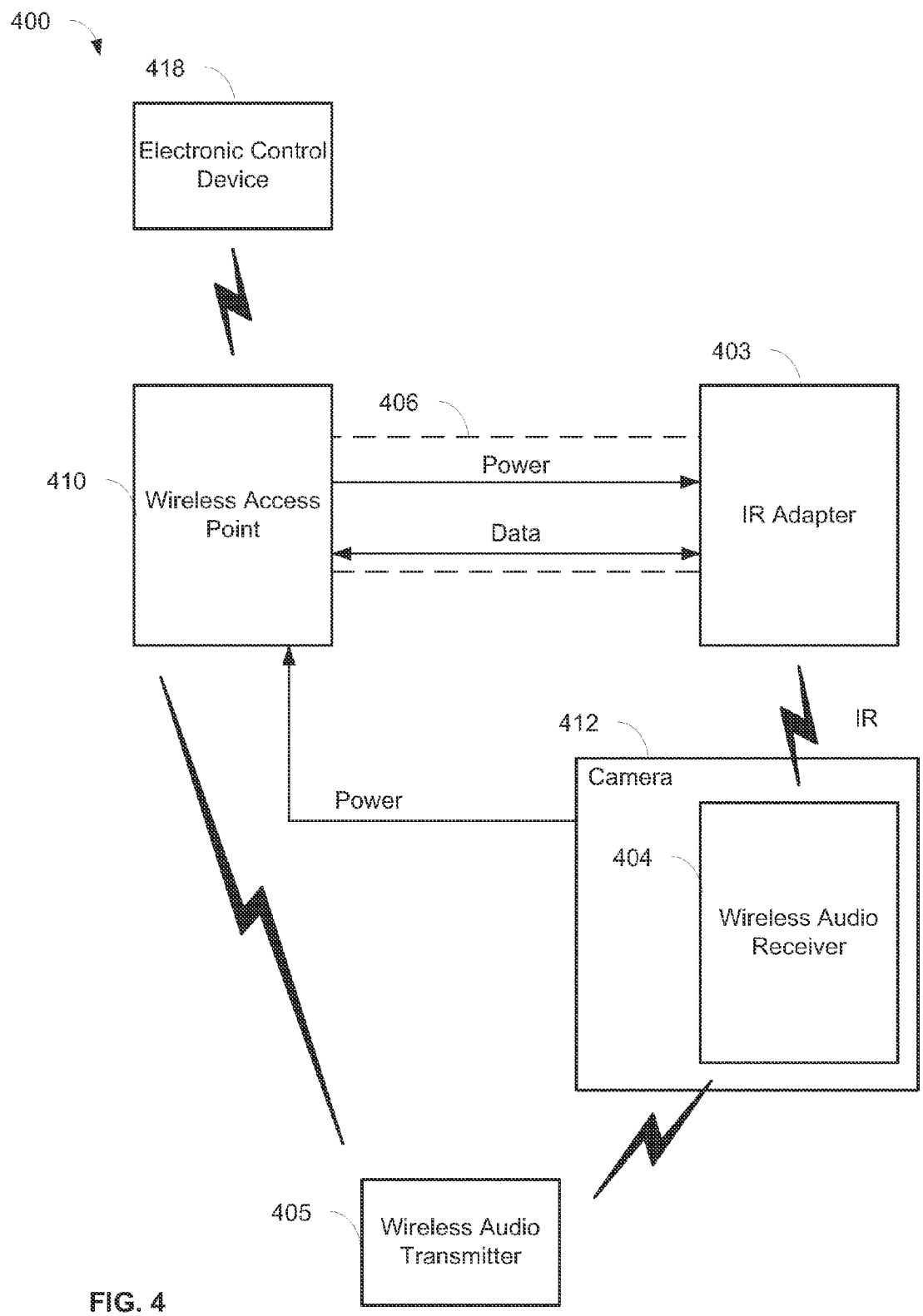
FIG. 4 is a block diagram of a portable audio networking system including a wireless access point, a wireless audio receiver, and an infrared adapter, in accordance with some embodiments.

In other embodiments, as shown in FIGS. 3 and 4, a wireless access point may be implemented in other configurations of portable audio networking systems to enable the remote monitoring and control of a wireless audio transmitter. The wireless access point may be considered a master device in these embodiments. FIG. 3 illustrates a block diagram of a portable audio networking system 300 that quickly and easily enables the remote monitoring and control of a wireless audio transmitter 305. The system 300 includes a wireless access point 310 that is in communication with a wireless audio receiver 304 via a cable 306. The wireless access point 310 can distribute electrical power from a power source 308 to the wireless audio receiver 304, and transmit data to and receive data from the wireless audio receiver 304 to enable remote monitoring and control of the wireless audio transmitter 305. The data may include commands, statuses, and/or other information. The cable 306 may simultaneously transport the data signal and the power signal between the wireless access point 310 and the wireless audio receiver 304. In some embodiments, the wireless audio receiver 304 may be independently powered. The power source 308 may also provide electrical power to the wireless access point 310.

An electronic control device 318 in wireless communication with the wireless access point 310 can be utilized to monitor and control the wireless audio transmitter 305. The wireless audio receiver 304 may receive an RF signal from the wireless audio transmitter 305 that contains an audio signal. The wireless audio receiver 304 may generate a digital audio signal based on the audio signal in the RF signal, and transmit the digital audio signal to another component, such as a recorder (not shown), through a separate connection for further processing. The wireless access point 310 may communicate with the wireless audio transmitter 305 over a 2.4 GHz IEEE 802.15.4 connection. A user, such as a crew member, may carry the power source 308, wireless access point 310, cable 306, wireless audio receiver 304, and/or the electronic control device 318 in a bag, for example.

FIG. 4 illustrates a block diagram of a portable audio networking system 400 that quickly and easily enables the remote monitoring and control of a wireless audio transmitter 405 that is in wireless communication with a wireless audio receiver 404 installed within a video camera 412. The wireless audio receiver 404 may be a slot-type receiver that is inserted into a receptacle of the video camera 412, for example. The video camera 412 may have a battery which can power the video camera 412, the wireless audio receiver 404, and/or a wireless access point 410. The wireless access point 410 is in communication with an infrared (IR) adapter 403 via a cable 406. The wireless access point 410 can distribute electrical power from the video camera 412 to the IR adapter 403, and transmit data to and receive data from the IR adapter 403 to enable remote monitoring and control of the wireless audio transmitter 405. The cable 406 may simultaneously transport the data signal and the power signal between the wireless access point 410 and the IR adapter 403. The data may include commands, statuses, and/or other information. An electronic control device 418 in wireless communication with the wireless access point 410 can be utilized to monitor and control the wireless audio transmitter 405.

The IR adapter 403 may mechanically interface with the wireless audio receiver 404, and enable optical IR communication between the IR adapter 403 and an au IR port on the wireless audio receiver 404. This configuration is useful to enable communication between the wireless access point 410 and the wireless audio receiver 404 when the wireless audio receiver 404 does not have a port to accept a cable. The wireless audio receiver 404 may not have such a port due to space constraints and/or because the interface between the slot-type wireless audio receiver 404 and the video camera 412 is within the video camera 412 itself, for example. The IR signal between the IR adapter 403 and the IR port on the wireless audio receiver 404 may include data from the wireless access point 410. The wireless audio receiver 404 may receive an RF signal from the wireless audio transmitter 405 that contains an audio signal. The wireless audio receiver 404 may generate a digital audio signal based on the audio signal in the RF signal, and transmit the digital audio signal to another component, such as a recorder (not shown) for further processing. The wireless access point 410 may communicate with the wireless audio transmitter 405 over a 2.4 GHz IEEE 802.15.4 connection. The wireless access point 410, cable 406, and/or the electronic control device 418 may be carried in a bag by a crew member, for example, or may be mounted on the video camera 412.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A portable audio networking system, comprising:
    a gateway interconnection device configured to receive a digital audio signal, receive a DC power from a power source, provide the DC power, and transceive a data signal; and
    a wireless audio receiver in communication with the gateway interconnection device, wherein the wireless audio receiver is configured to transmit the digital audio signal to the gateway interconnection device, receive the DC power from the gateway interconnection device, and transceive the data signal with the gateway interconnection device;
    wherein the gateway interconnection device and the wireless audio receiver are in communication over a Category 5 twisted-pair cable adapted to simultaneously transport the digital audio signal, the DC power, and the data signal;
    wherein the gateway interconnection device is further in communication with an audio device comprising one or more of an audio recorder or an audio mixer;
    wherein the gateway interconnection device is configured to generate a combined digital audio signal based on the digital audio signal, transmit the combined digital audio signal to the audio device, provide the DC power to the audio device, and transceive the data signal with the audio device, wherein the combined digital audio signal conforms to a Dante standard;
    wherein the data signal comprises a status of the gateway interconnection device and the wireless audio receiver.

2. The portable audio networking system of claim 1, wherein the wireless audio receiver is configured to:
    wirelessly receive a radio frequency (RF) signal containing an audio signal from a wireless audio transmitter, the RF signal comprising one or more of an analog modulated signal or a digital modulated signal; and
    generate the digital audio signal based on the audio signal.

3. The portable audio networking system of claim 1, wherein:
    the gateway interconnection device is further in communication with a wireless access point configured to wirelessly communicate with one or more of a wireless audio transmitter or an electronic control device;
    the gateway interconnection device is configured to provide the DC power to the wireless access point and transceive the data signal with the wireless access point; and
    the wireless access point is configured to enable control of a functionality of the wireless audio transmitter.

4. The portable audio networking system of claim 1, wherein the Category 5 twisted-pair cable comprises:
    a first differential pair for transporting the digital audio signal and a ground of the DC power; and
    a second differential pair for transporting the data signal and a positive voltage of the DC power.

5. The portable audio networking system of claim 1, wherein the digital audio signal conforms to an AES3 standard.

6. The portable audio networking system of claim 1, wherein:
    the data signal comprises bi-directional serial data communication conforming to an EIA-485 standard; and
    the serial data communication comprises one or more protocols of an Architecture for Control Networks (ACN) standard.

7. The portable audio networking system of claim 3, wherein the electronic control device comprises one or more of a smartphone, a tablet computer, a laptop computer, or a desktop computer, the electronic control device capable of executing an application to enable the control of the functionality of the wireless audio transmitter.

8. The portable audio networking system of claim 1, wherein:
    the gateway interconnection device and the wireless audio receiver each comprises an RJ45 port; and
    the Category 5 twisted-pair cable comprises a first RJ45 connector and a second RJ45 connector for connecting the gateway interconnection device and the wireless audio receiver through their respective RJ45 ports.

9. The portable audio networking system of claim 1, wherein the DC power is transported over the cable using aspects of a Power over Ethernet (PoE) standard.

* * * * *